United States Patent [19]
Demus et al.

[11] Patent Number: 5,539,556
[45] Date of Patent: Jul. 23, 1996

[54] LIGHT-SCATTERING MODE LIQUID CRYSTAL DISPLAY DEVICE, AND A PROCESS FOR PRODUCTION THEREOF, HAVING A TRANSPARENT INSOLUBLE LIQUID MATERIAL

[75] Inventors: Dietrich Demus, Chibashi; Etsuo Nakagawa, Ichiharashi, both of Japan

[73] Assignee: Chisso Corporation, Osaka, Japan

[21] Appl. No.: 223,002

[22] Filed: Apr. 5, 1994

[30] Foreign Application Priority Data

Apr. 9, 1993 [JP] Japan ................................ 5-107566

[51] Int. Cl.$^6$ ........................................................ G02F 1/13
[52] U.S. Cl. .................................................. 359/103; 359/99
[58] Field of Search ..................................... 359/103, 99

[56] References Cited

U.S. PATENT DOCUMENTS 4,666,253  5/1987  Yoshida ................................ 359/103

FOREIGN PATENT DOCUMENTS 1136843  7/1982  Canada .................................. 359/103
2606419  5/1988  France .................................. 359/103

*Primary Examiner*—Anita Pellman Gross
*Assistant Examiner*—James A. Dudek
*Attorney, Agent, or Firm*—Wenderoth, Lind & Ponack

[57] ABSTRACT

A liquid crystal device based upon the actuation principle of light scattering, and having low voltage-driving properties and a high contrast, and a process for producing the same are provided. The device is characterized in that it is provided with two substrates which may have an electrode layer and at least one of which is transparent, a light-modulating layer being present between the two substrates and having a liquid crystal material and transparent liquid substance insoluble therein, the transparent liquid substance being present in the form of micro-droplets in the liquid crystal material. The device exhibits a short response time, a bright display and a large contrast even under a condition of low driving voltage of 40 V or lower, and a clean threshold voltage to thereby effect a multiplex drive. Therefore, the device is applicable to a large size display element and can be produced very simply and cheaply.

9 Claims, No Drawings

LIGHT-SCATTERING MODE LIQUID CRYSTAL DISPLAY DEVICE, AND A PROCESS FOR PRODUCTION THEREOF, HAVING A TRANSPARENT INSOLUBLE LIQUID MATERIAL

BACKGROUND OF THE INVENTION

1. Field of the Invention

This invention relates to a liquid crystal display device for a large scale display element, based upon an actuation principle of light scattering, and having low voltage driving properties and high contrast, and also to a process for producing the same. The liquid crystal display device of the present invention is applicable to light shutter, display board, etc.

2. Description of the Related Art

As liquid crystal display elements, those of twisted nematic (TN) mode and supertwisted nematic (STN) mode using nematic liquid crystals have been practically used. However, as to these elements, since polarizers are used, the display has low transparency, and further since an aligning treatment on the substrate is required, the viewing angle is narrow. Still further, the above elements have a drawback of difficultly providing a large display area and are expensive. Thus, in order to overcome these drawbacks, various light-scattering mode devices and the preparation thereof have been proposed.

Japanese patent application laid-open No. Sho 58-501631 and U.S. Pat. No. 4,435,047 disclose a process of producing a light-scattering device by dispersing a microencapsulated liquid crystal in a polymer such as polyvinyl alcohol and forming a film from the polymer. According to this process, the liquid crystal microencapsulated by polyvinyl alcohol present in the thin layer film and having a positive dielectric anisotropy, is aligned in the direction of the electric field, and the thin layer film becomes transparent in the case where the ordinary refractive index $n_o$ of the liquid crystal is equal to the refractive index $n_p$ of the polymer. When the electric field is removed, the direction of liquid crystal occupies random positions; hence the refractive index of the liquid crystal deviates from $n_o$ so that light-scattering occurs and the thin layer film becomes white-turbid and opaque. Based upon such an actuation principle, preparation of a liquid crystal device having a bright and good contrast has been regarded as possible.

Further, Japanese patent application laid-open No. Hei 1-198725 discloses a process for producing a light-scattering mode display device, which process comprises steps of mixing a liquid crystal with a monomer or an oligomer, preparing a light-modulating layer containing the mixture, and irradiating ultraviolet rays to the layer to provide a three dimensional network structure formed in the layer. The actuation principle in this process is similar to that of the above Japanese patent application laid-open No. Sho 58-501631, and it has been said therein that a three-dimensional network structure of the polymer is formed in the continuous layer of the liquid crystal so that the proportion of the liquid crystal in the light-modulating layer is so large that it is unnecessary to take any particular precaution to accord the refractive index of the liquid crystal with that of the polymer, to thereby effect a high contrast.

The process disclosed in the above Japanese patent application laid-open No. Sho 58-501631 has a drawback that the proportion of the polymer in the thin film-constituting material is larger than that of the liquid crystal therein, and for example, when an electric field is impressed thereto, the electric field is exerted onto the liquid crystal via the polymer; hence, a higher driving voltage is required in order to afford a change to the alignment of the liquid crystal molecules. Further, the process has another drawback that since the proportion of the liquid crystal is small and a clear threshold voltage is absent, it is difficult to practice a large scale display according to multiplex drive.

Further, in order to achieve a sufficient transparency when an electric field necessary for driving is impressed or when a temperature exceeding the clearing point is employed, there is an additional restriction in the aspect of material choice in that the refractive index of the liquid crystal should be similar to that of the polymer. Further, since the microencapsulation of the liquid crystal is accompanied with crushing and drying steps, additional time for the succeeding step of preparing a thin layer film is required and hence such steps are cumbersome.

In the case of the above Japanese patent application laid-open No. Hei 1-198725, a mechanical dispersion step and a polymerization step of the monomer or oligomer by way of heat or ultraviolet irradiation are required, and controls of these steps are very difficult. In other words, the process has a drawback that it is very difficult to uniformly form the three-dimensional network of a polymer having a size effective for producing light scattering. Further, in the case of a large area display as premise, it is very difficult to insert a mixture of a monomer or an oligomer with liquid crystal between the substrates. Further, a case may be present that a mixture of a monomer or an oligomer with a liquid crystal is coated onto one of the substrates, but in this case, a coating step and a laminating step of the substrates are required, and as a result, there occurs a drawback that the steps of preparing the device are very complicated. Further, in order to polymerize the monomer or oligomer, heat or ultraviolet rays should be irradiated; hence there remains a possibility that the characteristics of the mixed liquid crystal are varied.

These drawbacks bring about a serious obstacle when the liquid crystal device having a large area is practically used; hence they are problems to be overcome.

The present inventors have made extensive research in order to solve the problems, and as a result, they have invented a liquid crystal device having low voltage-driving properties and a high contrast for a large scale display element and being very simple and cheap, and a process for producing the same.

SUMMARY OF THE INVENTION

Briefly speaking, the novel liquid crystal device according to the present invention is characterized in that the device has a structure wherein a liquid crystal material and a transparent liquid substance in the form of droplets, insoluble in the liquid crystal material are present between two substrates. Namely, a light-scattering boundary surface is formed between the liquid crystal material and the transparent liquid substance insoluble in the liquid crystal material, whereby a light-modulating layer is formed. By driving the thus obtained light-modulating layer, display is made.

The present invention in the first aspect is expressed by item 1 and its embodiments are the following items 2 to 7.

1. A light-scattering mode liquid crystal display device comprising:

(1) two substrates which may have an electrode layer on the surface thereof and at least one of which is transparent, and (2) a light-modulating layer filled between said two substrates, said light-modulating layer comprising a liquid crystal material and a transparent liquid material in the form of droplets, insoluble in said liquid crystal material.

2. A light-scattering mode liquid crystal display device according to item 1 wherein the liquid crystal material is a liquid crystal mixture having at least one of nematic, cholesteric and smectic phases.

3. A light-scattering mode liquid crystal display device according to the item 1 or 2 wherein the light-modulating layer contains as its constituting component, at least 50% by weight of the liquid crystal material.

4. A light-scattering mode liquid crystal display device according to any one of items 1, 2 or 3 wherein the phases of the liquid crystal material change reversibly between liquid crystal phase and isotropic phase depending upon the temperature change of the liquid crystal material whereby the light-modulating layer changes reversibly between light-scattering opaque state and transparent state.

5. A light-scattering mode liquid crystal display device according to any one of item 1, 2 or 3 wherein the two substrates each have an electrode layer, and the liquid crystal material reversibly changes the alignment of liquid crystal molecules depending upon the presence or absence of the electric field applied to the electrodes, whereby the light-modulating layer changes reversibly between transparent state and light-scattering opaque state.

6. A light-scattering mode liquid crystal display device according to any one of items 1 to 5, wherein the transparent liquid material insoluble in the liquid crystal material is a silicone oil.

7. A light-scattering mode liquid crystal display device according to any one of items 1 to 6, wherein the light-modulating layer has a thickness of 5 to 100 μm.

The present invention in another aspect is expressed by item 8 and its embodiment is the following item 9.

8. A process for producing a light-scattering mode liquid crystal display device comprising:

preparing a mixture of a liquid crystal material with a transparent liquid material insoluble in the liquid crystal material, treating the mixture to prepare a preliminary dispersion of the liquid material in the liquid crystal material, treating the preliminary dispersion with an ultrasonic vibrator to prepare a stable dispersion, and placing the stable dispersion between two substrates at least one of which is transparent.

9. A process for producing a light-scattering mode liquid crystal display device according to item 8 wherein the substrates have an electrode layer on the surface thereof.

DETAILED DESCRIPTION OF PREFERRED EMBODIMENTS

The substrates may be those of either a solid material such as glass, metal, etc. or a soft material such as plastic film. Two sheets of the substrates may be opposed to each other in a suitable distance, and at least one of them should be transparent and the light-modulating layer present between the two sheets should be viewed from outside. However, it is not always indispensable for the substrates to have a complete transparency.

When the liquid crystal device is used with light passing from one side of the substrates to another side, a suitable clarity is required for both the sheets of the substrates. The substrates may be provided with a suitable transparent or opaque electrode over the total surface or partly in accordance with the object. It is preferred to place a spacer between the two sheets of the substrates for retaining a distance according to a conventional method. A light-modulating layer consisting of a liquid crystal material and a transparent liquid substance insoluble in the above material is placed between the two sheets of the substrates.

The liquid crystal material used in the present invention is not always necessarily a single compound, but it may be a mixture of two or more kinds of liquid crystal compounds or a liquid crystal mixture containing other substances such as polychroic dyes. Usually, the material may be those which have been recognized to be liquid crystal in the technical field and change the molecular alignment thereof under an action of heat, electric field or magnetic field.

As the liquid crystal used, nematic liquid crystals, cholesteric liquid crystals or smectic liquid crystals are preferred, and nematic liquid crystals or cholesteric liquid crystals having a positive dielectric anisotropy are particularly preferred.

Further, in order to sufficiently exhibit the light-scattering effect, a liquid crystal having a larger optical anisotropy ($\Delta n$) is preferred. Further, in the case of an electric field drive as a premise, a liquid crystal having a larger dielectric anisotropy ($\Delta \epsilon$) is preferred in order to make the driving voltage as low as possible.

The mixing proportion of the liquid crystal material as component constituting the light-modulating layer is preferably 50% by weight or larger, more preferably 60 to 90% by weight. If the proportion of the liquid crystal as the component constituting the light-modulating layer is too large, the light-scattering boundary surface formed from the liquid crystal and droplets of the transparent liquid substance insoluble in the liquid crystal is reduced; hence a sufficient scattering is not obtained, but elevation of the transmittance in the opaque state occurs; thus, the display contrast is reduced. On the other hand, if the proportion of the liquid crystal is too small, the transmittance at the transparent time is reduced, resulting in the contrast reduction.

The transparent liquid substance used in the present invention may be any of those which are insoluble in the liquid crystal material and dispersive in the form of microdroplets insoluble in the liquid crystal material. Its clarity may be adequately specified in accordance with the use object of the device. Examples of such transparent liquid substance are water, silicone oil, solution of inorganic and organic salts in water, glycol and glycerine and their mixtures with water, long chain alcohols, long chain fatty acids, etc., and among these, silicone oils are most preferable, in view of low volatility, thermal stability, chemical stability, electrical insulation properties, etc.

Preparation of the micro-droplets from the transparent liquid substance can be achieved by mixing the transparent liquid substance with the liquid crystal material in a suitable proportion and dispersing the former in the latter. As the dispersing method, conventional mixing methods such as stirring, shaking, etc. are considered, but it is most simple and effective to carry out dispersing according to ultrasonic dispersing method after the above preliminary dispersing. According to this method, micro-droplets of several microns to several tens of microns are formed in the liquid crystal. As causes of hindering the stability of the micro-droplets over a long time, formation of large liquid droplets due to agglomeration, phase separation due to sedimentation, etc. are considered, but agglomeration hardly occurs by narrowing the distance between the substrates, and phase separation hardly occurs by selecting a transparent liquid substance having a density to the same extent as that of a density of the liquid crystal material.

The first specific feature of the present invention consists in that the light-modulating layer can be very simply formed between two substrates. The liquid crystal material having the micro-spherical droplets of transparent liquid substance dispersed therein can be simply filled between two substrates as in case of conventional cell preparation. Thus, it is possible to form the light-modulating layer very simply and cheaply, without any complicated steps such as microencapsulation step, polymerization step, etc.

Further, as a specific intrinsic feature of the light-scattering mode display, it is of course possible to obtain a display which is bright, has a good contrast, has a large viewing angle and a large pictorial surface.

Another specific feature of the present invention consists in that it is possible to obtain a larger proportion of the liquid crystal constituting the light-modulating layer; hence even if no particular precaution is taken to e.g. similarity of the refractive indices, etc. of the liquid crystal and the transparent liquid substance in choosing these constituent materials, a high contrast is exhibited. Further, by making larger the proportion of the liquid crystal constituting the light-modulating layer, a clear threshold voltage relative to the light-modulating layer is exhibited based upon the premise of the field drive; thus the multiplex drive of the device becomes possible.

In the case of such a liquid crystal device, even if no voltage is impressed, the phase of the liquid crystal material changes into a transparent phase when the material reaches a temperature at which the phase of the material changes into an isotropic liquid phase; hence by choosing a liquid crystal material having a suitable phase transition point, the device can be also used as a light-modulating liquid crystal device of temperature response mode within a desired temperature range.

EXAMPLE

The present invention will be described in more detail by way of Examples, but it should not be construed to be limited thereto.

Example 1

A liquid crystal (GR-63, trade name of product made by Chisso Corporation)(65% by weight) as a liquid crystal material was mixed with a silicone oil (KF-99, trade name of product made by Shinetsu Chemical Industry Co., Ltd.)(35% by weight) as a transparent liquid, followed by manually shaking the mixture several times and then subjecting it to ultrasonic dispersing for 30 minutes. The resulting mixed liquid was white-turbid and formed a strong light scattering. This mixed liquid was filled in a cell composed of opposed glass plates each provided with an ITO transparent electrode of dimension of 30 square millimeter, in a distance of 50 μm between the electrodes, to prepare a liquid crystal device.

The voltage-transmittance curve of the resulting liquid crystal device was measured at 25° C. in the range of an impression voltage of 0 to 50 V to give a threshold voltage of 10.8 V. In addition, the transmittance at the time of opacity at a voltage of 0 V was 0.03% and the transmittance at the time of transparency at a voltage of 50 V was 34.4%.

Example 2

A liquid crystal (GR-63, trade name of product made by Chisso Corporation) (75% by weight) as a liquid crystal material was mixed with a silicone oil (KF-99, trade name of product made by Shinetsu Chemical Industry Co. Ltd.)(25% by weight) as a transparent liquid, followed by preparing a liquid crystal device having a distance of 50 μm between the electrodes in the same manner as in Example 1.

The resulting liquid crystal device exhibited, at a measured temperature of 25° C. and under a driving voltage (hereinafter referred to as a root mean square voltage) of 40 V, a rise time of 20 milliseconds, a decay time of 58 milliseconds, and a contrast ratio of 1:32.

Mixed liquids of the liquid crystal material "GR-63" (70, 80, 85 or 90% by weight) with the silicone oil "KF-99" (30, 20, 15 or 10% by weight) were respectively prepared, followed by preparing liquid crystal devices in the same manner as above. The characteristics thereof are shown in Table 1 together with the results of Examples 1 and 2.

TABLE 1

| Concentration of GR-63 (wt. %) | 65 | 70 | 75 | 80 | 85 | 90 |
|---|---|---|---|---|---|---|
| Concentration of KF-99 (wt. %) | 35 | 30 | 25 | 20 | 15 | 10 |
| Threshold voltage (Volt) | 10.8 | 9.2 | 7.8 | 6.6 | 5.3 | 3.9 |
| Transmittance at a voltage of 0 V (%) | 0.03 | 0.03 | 0.03 | 0.86 | 7.1 | 12.0 |
| Transmittance at a voltage of 50 V (%) | 34.4 | 39.3 | 42.0 | 48.2 | 55.7 | 59.5 |
| Example No. | 1 | | 2 | | | |

As seen from Table 1, the respective liquid crystal devices exhibit a clear threshold voltage and have large contrast between the opaque state and the transparent state in view of the transmittance at 0 V and that at 50 V.

In addition, the characteristics of the used liquid crystal "GR-63" were as follows:

Clearing point: 63.5° C.,

Threshold voltage (Vth at 25° C.): 1.48 V,

Ordinary refractive index ($n_o$ at 25° C.): 1.522,

Optical anisotropy (Δn at 25° C.): 0.222,

Dielectric anisotropy (Δε at 25° C.): 11.8,

Viscosity (20° C.): 45.0 cP,

Specific gravity (at 25° C.): 1.04.

Furhther, the characteristics of the used silicone oil "KF-99" were as follows:

Refractive index (at 25° C.): 1.396,

Viscosity (at 25° C.): 20 cP,

Specific gravity (at 25° C.): 1.00.

Example 3

Example 2 was repeated except that a silicone oil "KF-961-100" made by Shinetsu Chemical Industry Co., Ltd. was used as the transparent liquid insoluble in the liquid crystal material, to prepare a liquid crystal device having a distance of 50 μm between the electrodes.

The resulting liquid crystal device exhibited, at a measurement temperature of 25° C. and under a driving voltage of 40 V, a rise time of 18 milliseconds, a decay time of 72 milliseconds, and a contrast ratio of 1:25.

The characteristics of the used silicone oil "KF-961-100" were as follows:

Refractive index (at 25° C.): 1.404,

Viscosity (at 25° C.): 90 cP,

Specific gravity (at 25° C.): 1.02.

Example 4

Example 2 was repeated except that a liquid crystal "DP-1003XX" made by Chisso Corporation (75% by weight) was used as the liquid crystal material, to prepare a liquid crystal device having a distance of 50 μm between the electrodes. The resulting liquid crystal device exhibited, at a measurement temperature of 25° C. and at a driving voltage of 35 V, a rise time of 15 milliseconds, a decay time of 93 milliseconds, and a contrast ratio of 1:17.

The characteristics of the used liquid crystal "DP-1003XX" were as follows:

Clearing point: 79.2° C.,

Threshold voltage (Vth at 25° C.): 1.10 V,

Ordinary refractive index ($n_o$ at 25° C.): 1.522,

Optical anisotropy (Δn at 25° C.): 0.201,

Dielectric anisotropy (Δε at 25° C.): 20.6,

Viscosity (at 25° C.): 54.4 cP,

Specific gravity (at 25° C.): 1.03.

Example 5

Example 2 was repeated except that distilled water was used in a quantity of 25% by weight, as the transparent liquid insoluble in the liquid crystal material, to prepare a liquid crystal device having a distance of 50 μm between the electrodes.

The resulting liquid crystal device exhibited, at a measurement temperature of 25° C. and at a driving voltage of 40 V, a rise time of 26 milliseconds, a decay time of 53 milliseconds and a contrast ratio of 1:15.

Example 6

The liquid crystal device used in Example 2 was subjected to measurement of its transmittance (at the opaque time) at 25° C., without impressing any electric field, to give a transmittance of 0.03%.

Further, the transmittance (at the transparent time) at 7° C. was measured to give 86.9%.

It is seen from the above facts that the liquid crystal device is usable as a light-modulating device of temperature-response mode.

(Effectiveness of the Invention)

As illustrated in the Examples, the liquid crystal device of the present invention exhibits a short response time, a bright display and a very large contrast ratio, even under a condition of a low driving voltage of 40 V or lower. Further, since it has a clear threshold voltage, multiplexing drive of the device is possible. Thus, the device is usable as a liquid crystal device for a large scale mode display element.

Furthermore, as illustrated in the Examples, the liquid crystal device of the present invention can be produced very simply and cheaply.

What we claim is:

1. A light-scattering mode liquid crystal display device comprising:
    (1) two substrates which may have an electrode layer on the surface thereof and at least one of which is transparent, and
    (2) a light modulating layer filled between said two substrates, said light-modulating layer comprising a liquid crystal material and a transparent liquid material in the form of droplets, insoluble in said liquid crystal material.

2. A light-scattering mode liquid crystal display device according to claim 1 wherein said liquid crystal material is a liquid crystal mixture having at least one of nematic, cholesteric and smectic phases.

3. A light-scattering mode liquid crystal display device according to claim 1 or 2 wherein said light-modulating layer contains as its constituting component, at least 50% by weight of said liquid crystal material.

4. A light-scattering mode liquid crystal display device according to claim 1 or 2, wherein the phase(s) of said liquid crystal material change reversibly between a liquid crystal phase and an isotropic liquid phase, depending upon the temperature change of said liquid crystal material, whereby said light-modulating layer changes reversibly between a light-scattering opaque state and a transparent state.

5. A light-scattering mode liquid crystal display device according to claim 1 or 2, wherein said two substrates each have an electrode layer, and said liquid crystal material reversibly changes the alignment of liquid crystal molecules depending upon the presence or absence of the electric field applied to the electrodes, whereby said light-modulating layer changes reversibly between a transparent state and a light-scattering opaque state.

6. A light-scattering mode liquid crystal display device according to claim 1 or 2, wherein said liquid material insoluble in said liquid crystal material is a silicone oil.

7. A light-scattering mode liquid crystal display device according to claim 1 or 2, wherein said light modulating layer has a thickness of 5 to 100 μm.

8. A process for producing a light-scattering mode liquid crystal display device comprising:
    preparing a mixture of a liquid crystal material with a transparent liquid material insoluble in said liquid crystal material,
    treating said mixture to prepare a preliminary dispersion of said liquid material in said liquid crystal material,
    treating said preliminary dispersion with an ultrasonic vibrator to prepare a stable dispersion, and
    placing said stable dispersion between two substrates at least one of which is transparent.

9. A process for producing a light-scattering mode liquid crystal display device according to claim 8 wherein said substrates have an electrode layer on the surface thereof.

* * * * *